US008968604B2

(12) United States Patent
Kitano

(10) Patent No.: US 8,968,604 B2
(45) Date of Patent: Mar. 3, 2015

(54) SINGLE-WALLED CARBON NANOTUBE DISPERSION LIQUID AND METHOD FOR PRODUCING SINGLE-WALLED CARBON NANOTUBE DISPERSION LIQUID

(75) Inventor: Takahiro Kitano, Ibaraki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 782 days.

(21) Appl. No.: 12/597,844

(22) PCT Filed: Apr. 24, 2008

(86) PCT No.: PCT/JP2008/057923
§ 371 (c)(1),
(2), (4) Date: Mar. 1, 2010

(87) PCT Pub. No.: WO2008/136347
PCT Pub. Date: Nov. 13, 2008

(65) Prior Publication Data
US 2010/0187485 A1 Jul. 29, 2010

(30) Foreign Application Priority Data

Apr. 27, 2007 (JP) .................................. 2007-118010

(51) Int. Cl.
*B82Y 30/00* (2011.01)
*C01B 31/00* (2006.01)
*C01B 31/02* (2006.01)
*B82Y 40/00* (2011.01)

(52) U.S. Cl.
CPC ............. *C01B 31/0273* (2013.01); *B82Y 30/00* (2013.01); *B82Y 40/00* (2013.01); *C01B 31/0213* (2013.01); *Y10S 977/734* (2013.01); *Y10S 977/735* (2013.01); *Y10S 977/737* (2013.01); *Y10S 977/742* (2013.01)
USPC ........... 252/502; 252/500; 252/510; 977/734; 977/735; 977/737; 977/742

(58) Field of Classification Search
CPC .. B82Y 30/00; C01B 31/0213; C01B 31/022; C01B 2202/02; C01B 2202/06
USPC ........ 252/500–518.3; 977/734, 735, 737, 742
See application file for complete search history.

(56) References Cited

U.S. PATENT DOCUMENTS

| | | |
|---|---|---|
| 5,698,175 A | 12/1997 | Hiura et al. |
| 2002/0187403 A1 | 12/2002 | Hinokuma et al. |
| 2002/0197521 A1* | 12/2002 | Hinokuma et al. ............. 429/33 |

(Continued)

FOREIGN PATENT DOCUMENTS

| | | |
|---|---|---|
| JP | 8 12310 | 1/1996 |
| JP | 2003-183011 A | 7/2003 |

(Continued)

OTHER PUBLICATIONS

Guldi et al. ("Supramolecular Hybrids of [60]Fullerene and Single-Wall Carbon Nanotubes" Chem Europ J., 12, p. 3975-3983, pub online Apr. 3, 2006).*

(Continued)

*Primary Examiner* — Tri V Nguyen
(74) *Attorney, Agent, or Firm* — Oblon, McClelland, Maier & Neustadt, L.L.P.

(57) ABSTRACT

Disclosed is a single-walled carbon nanotube dispersion liquid containing a single-walled carbon nanotube, a fullerene and a solvent.

16 Claims, 3 Drawing Sheets

(56) References Cited

U.S. PATENT DOCUMENTS

| | | |
|---|---|---|
| 2003/0065206 A1* | 4/2003 | Bolskar et al. .................. 558/87 |
| 2003/0086858 A1* | 5/2003 | Niu et al. .................... 423/447.1 |
| 2003/0122111 A1 | 7/2003 | Glatkowski |
| 2004/0048127 A1* | 3/2004 | Shirai et al. ..................... 429/33 |
| 2004/0120879 A1* | 6/2004 | Chen et al. ................ 423/447.1 |
| 2005/0089684 A1* | 4/2005 | Barron et al. .................. 428/408 |
| 2005/0284337 A1 | 12/2005 | Shigematsu et al. |
| 2006/0275371 A1* | 12/2006 | Dai et al. ...................... 424/489 |
| 2007/0096066 A1* | 5/2007 | Yoshida et al. ................ 252/511 |
| 2007/0292622 A1* | 12/2007 | Rowley et al. ............. 427/407.1 |
| 2008/0023396 A1* | 1/2008 | Fugetsu ...................... 210/502.1 |
| 2009/0032777 A1 | 2/2009 | Kitano et al. |

FOREIGN PATENT DOCUMENTS

| | | | |
|---|---|---|---|
| JP | 2005 8893 | 1/2005 | |
| JP | WO2005/110594 A1 * | 11/2005 | ............. B01J 20/20 |
| JP | 2006 8861 | 1/2006 | |
| TW | 200711994 | 4/2007 | |
| WO | WO 2008/002317 A1 | 1/2008 | |

OTHER PUBLICATIONS

Inam et al. ("Dimethylformamide: an effective dispersant for making ceramic-carbon nanotube composites." Nanotechnology, 19 (195710), pp. 1-5, online pub Apr. 8, 2008).*

Pickering et al. ("Fullerol-Sensitized Production of reactive oxygen species in aqueous solution." Environ. Sci. Technol., 39, pp. 1359-1365, Web Jan. 21, 2005).*

Takaguchi, Y. et al., "Fullerodendron-assisted Dispersion of Single-walled Carbon Nanotubes via Noncovalent Functionalization", Chemistry Letters, vol. 34, No. 12, pp. 1608-1609 (2005).

Yanagimoto Y. et al., "Solubilization of Carbon Nanotubes by Supermolecular Encapsulation of Fullerodendron", CSJ The Chemical Society, vol. 84th, No. 1, p. 58 (2 A4-31) (Mar. 11, 2004).

M. F. Islam, et al., "High Weight Fraction Surfactant Solubilization of Single-Wall Carbon Nanotubes in Water", Nano Letters, vol. 3, No. 2, 2003, pp. 269-273.

M chael J. O'Connell, et al., "Reversible water-solubilization of single-walled carbon nanotubes by polymer wrapping", Chemical Physics Letters, Jul. 13, 2001, pp. 265-271.

Tobias Hertel, et al., "Spectroscopy of Single- and Double-Wall Carbon Nanotubes in Different Environments", Nano Letters, vol. 5, No. 3, Jan. 13, 2005, pp. 511-514.

U.S. Appl. No. 12/597,802, filed Oct. 27, 2009, Kitano.

U.S. Appl. No. 12/447,377, filed Apr. 27, 2009, Kitano, et al.

U.S. Appl. No. 13/938,850, filed Jul. 10, 2013, Kitano, et al.

Office Action issued Jun. 5, 2013 in Japanese Patent Application No. 2009-512950 (with English language translation).

Extended European Search Report issued May 23, 2014 in Patent Application No. 08752022.7.

Cheng Li et al., "A Fullerene-single Wall Carbon Nanotube Complex for Polymer Bulk Heterojunction Photovoltaic Cells", Journal of Materials Chemistry, vol. 17, No. 23, XP-008141977, Mar. 12, 2007, pp. 2406-2411.

* cited by examiner

SINGLE-WALLED CARBON NANOTUBE DISPERSION LIQUID AND METHOD FOR PRODUCING SINGLE-WALLED CARBON NANOTUBE DISPERSION LIQUID

APPLICABLE FIELD IN THE INDUSTRY

The present invention relates to a carbon nanotube dispersion liquid, particularly, for producing a transparent conductive film.

BACKGROUND ART

Recently, an enlargement of a market of flat-screen devices typified by a liquid display augments a demand for the transparent conductive film. Additionally, the transparent conductive film is employed for an electrode. Further, it is employed for a member constituting a resistive touch panel technique. Further, it is employed for an electromagnetic wave shielding film. It is employed for various fields besides them. The transparent conductive film of this type, as a rule, is made of metal oxide such as Indium thin oxide (ITO). And, this transparent conductive film is manufactured in vacuum with the methods such as sputtering while a substrate is heated. Thus, the film-forming with these methods necessitates a high temperature. For this, the use of a resin substrate having a poor heat-resistance is greatly restricted. In addition, the film-forming requires a vacuum environment. For this, a gigantic film-forming device is necessitated as the substrate become big. Thus, the film-forming becomes costly. Further, In etc. is hard to obtain because it is rare. Thus, ITO becomes costly from this viewpoint as well.

The alternative technology, which replaces ITO, has been proposed from such a background. In particular, the technology has been proposed of forming the carbon nanotube film with the coating method. Additionally, the transparent conductive film using the carbon nanotube is highly evaluated.

By the way, it is said that the single-walled carbon nanotube, out of the carbon nanotubes, is highest in conductivity. As it is, it is hard to disperse the single-walled carbon nanotube into a solvent. Thus, it is not easy to constitute the single-walled carbon nanotube conductive film with the coating technique. Thereupon, the technique employing a dispersing agent has been proposed. For example, it is proposed to employ sodium dodecyl sulfate (Non-patent document 1). Further, it has been proposed to employ sodium dodecylbenzene sulfonate (Non-patent document 1). Further, it has been proposed to employ octylphenol polyethylene glycol ether (Non-patent document 1). Further, it has been proposed to employ sodium cholate (Non-patent document 2). Further, it has been proposed to employ polyvinylpyrrolidone (Non-patent document 3).

Non-patent document 1: M. F. Islam et al. "NANO LETTERS 2003, Vol. 3, 269"

Non-patent document 2: T. Hertel et al. "NANO LETTERS 2005, Vol. 2, 511"

Non-patent document 3: Michael J. O'Connel et al. "Chemical Physics Letters 342 (2001) 265"

DISCLOSURE OF THE INVENTION

Problems to be Solved by the Invention

However, only the single-walled carbon nanotube dispersion liquid of which a concentration is low can be obtained even though a large quantity of sodium dodecylbenzene sulfonate (dispersing agent) is employed. For example, in the Non-patent document 1, even though 20 mass % of sodium dodecylbenzene sulfonate over a solvent is used, only the single-walled carbon nanotube dispersion liquid of which a concentration is low can be obtained.

With the case of employing polyvinylpyrrolidone (Non-patent document 3) as a dispersing agent, the single-walled carbon nanotube dispersion liquid of which a concentration is high can be obtained. The dispersing agent, however, cannot be removed. For this, even though a film of the single-walled carbon nanotube is formed, this single-walled carbon nanotube film cannot exhibit a high conductivity. Thus, for this reason, it is hard to utilize this film as a transparent conductive film.

In such a manner, the prior art is capable of obtaining only the single-walled carbon nanotube dispersion liquid of which a concentration is low even though a large quantity of the dispersing agent is employed. That is the reason why the practical coating method such as a bar coating cannot be employed therefor.

Further, the prior art succeeded in dispersing the single-walled carbon nanotube into organic solvents such as tetrahydrofuran and dimethylformamide. However, tetrahydrofuran is very toxic. Further, the boiling point of dimethylformamide is too high. Thus, the use of these solvents is not preferable. That is, it is difficult to put them to practical use.

From such a background, it is desirable that the single-walled carbon nanotube dispersion liquid dispersed into the solvents such as water and alcohol (for example, alcohol such as methanol and 2-propanol) comes out.

However, so far, employing water (only water) as a solvent has caused a problem that wettability is bad and dispersibility is bad.

Thus, a task that the present invention is to solve, that is, an object of the present invention is to solve the above-mentioned problems.

In particular, an object of the present invention is to provide the single-walled carbon nanotube dispersion liquid having a high concentration/high dispersibility that enable the transparent conductive film having high conductivity/transparency to be formed with a simple coating technology.

Means for Solving the Problem

This inventor has found out that employing fullerene leads to an enhancement in the dispersibility of the single-walled carbon nanotube even though water is employed as a solvent in the course of earnestly pushing an investigation for solving the foregoing problems.

And, the inventor has found out that the transparent conductive film having a high conductivity/transparency can be constituted with a simple coating means.

The present invention has been accomplished based upon this knowledge.

That is, the foregoing problems are solved by a single-walled carbon nanotube dispersion liquid that is characterized in containing a single-walled carbon nanotube, a fullerene, and a solvent.

In particular, the foregoing problems are solved by the single-walled carbon nanotube dispersion liquid that is characterized in containing a single-walled carbon nanotube, a fullerene, and a solvent, and having a content of 10 to 1000 mass parts of the fullerene per 100 mass parts of the single-walled carbon nanotube.

In addition, the foregoing problems are solved by the above-mentioned single-walled carbon nanotube dispersion liquid that is characterized in that a concentration of the fullerene is 1 to 100000 ppm.

Among others, the foregoing problems are solved by the above-mentioned single-walled carbon nanotube dispersion liquid that is characterized in that the fullerene has a polar group.

Particularly, among others, the foregoing problems are solved by the above-mentioned single-walled carbon nanotube dispersion liquid that is characterized in that the fullerene has an OH group.

Further, the foregoing problems are solved by the above-mentioned single-walled carbon nanotube dispersion liquid that is characterized in that the single-walled carbon nanotube is a single-walled carbon nanotube subjected to a wet oxidation process.

Particularly, the foregoing problems are solved by the above-mentioned single-walled carbon nanotube dispersion liquid that is characterized in that the single-walled carbon nanotube is a single-walled carbon nanotube subjected to a wet oxidation process of performing a reflux operation for 24 hours or more with nitric acid having a concentration of 50% or more, or a mixed acid of nitric acid and sulfuric acid.

Further, the foregoing problems are solved by the above-mentioned single-walled carbon nanotube dispersion liquid that is characterized in that the single-walled carbon nanotube is a single-walled carbon nanotube obtained with an arc-discharge method.

Further, the foregoing problems are solved by the above-mentioned single-walled carbon nanotube dispersion liquid that is characterized in that the single-walled carbon nanotube has a first absorption in a Raman scattering intensity in a range of which a Raman shift is $1340\pm1.40$ cm$^{-1}$, and a second absorption in a Raman scattering intensity in a range of which a Raman shift is $1590\pm20$ cm$^{-1}$, and yet satisfies a condition of $0<$(the foregoing intensity of the first absorption)/(the foregoing intensity of the second absorption)$\leq0.03$ absorption) in terms of a Raman spectrum characteristic that is detected with the 532 nm laser excitation.

Further, the foregoing problems are solved by the above-mentioned single-walled carbon nanotube dispersion liquid that is characterized in that the single-walled carbon nanotube exists in a situation of being bundled, and the number of the bundles of which a length exceeds 1.5 μm is more than that of the bundles of which a length is 1.5 μm or less.

Further, the foregoing problems are solved by the above-mentioned single-walled carbon nanotube dispersion liquid that is characterized in that the single-walled carbon nanotube exists in a situation of being bundled, and the length of the foregoing bundle is not single but has a predetermined distribution in which a mode in the frequency distribution of the bundle length for each 0.5 μm exceeds 1.5 μm.

Among others, the foregoing problems are solved by the above-mentioned single-walled carbon nanotube dispersion liquid that is characterized in that the single-walled carbon nanotube exists in a situation of being bundled, the length of the foregoing bundle is not single but has a predetermined distribution in which a mode in the frequency distribution of the bundle length for each 0.5 μm exceeds 1.5 μm, and yet the number of the bundles of which a length exceeds 1.5 μm is more than that of the bundles of which a length is 1.5 μm or less.

Further, the foregoing problems are solved by the above-mentioned single-walled carbon nanotube dispersion liquid that is characterized in that at least one member selected from a group of water and alcohol is employed as a solvent.

Further, the foregoing problems are solved by the above-mentioned single-walled carbon nanotube dispersion liquid that is characterized in that the solvent is a solvent of which PH exceeds 7.

Further, the foregoing problems are solved by the above-mentioned single-walled carbon nanotube dispersion liquid that is characterized in: that it has a maximal of the absorbance originating in the single-walled carbon nanotube in a range of 800 nm to 1200 nm in the case of measuring absorbance of the single-walled carbon nanotube dispersion liquid diluted with the solvent employed for the dispersion liquid by a factor of 5, and the above maximal is 0.1 or more; and that it has a maximal of the absorbance originating in the single-walled carbon nanotube in a range of 800 nm to 1200 nm in the case of measuring absorbance of the single-walled carbon nanotube dispersion liquid diluted with the solvent employed for the dispersion liquid by a factor of 20, and the above maximal is 2.0 or less.

Further, the foregoing problems are solved by a single-walled carbon nanotube dispersion liquid that is characterized in: that it has a maximal of the absorbance originating in the single-walled carbon nanotube in a range of 800 nm to 1200 nm in the case of measuring absorbance of the single-walled carbon nanotube dispersion liquid diluted with the solvent employed for the dispersion liquid by a factor of 5, and the above maximal is 0.1 or more; and that it has a maximal of the absorbance originating in the single-walled carbon nanotube in a range of 800 nm to 1200 nm in the case of measuring absorbance of the single-walled carbon nanotube dispersion liquid diluted with the solvent employed for the dispersion liquid by a factor of 20, and the above maximal is 2.0 or less.

Further, the foregoing problems are solved by a method of producing a single-walled carbon nanotube dispersion liquid that is characterized in including: a mixture step of mixing a single-walled carbon nanotube, a fullerene, and a solvent; and a dispersion step of, after the foregoing mixture step, irradiating the obtained mixed liquid with ultrasonic waves, thereby to yield a dispersion liquid.

Particularly, the foregoing problems are solved by the foregoing method of producing a single-walled carbon nanotube dispersion liquid that is characterized in including: a mixture step of mixing a single-walled carbon nanotube, a fullerene, and a solvent; and a dispersion step of, after the foregoing mixture step, irradiating the obtained mixed liquid with ultrasonic waves, thereby to yield a dispersion liquid.

Among others, the foregoing problems are solved by the foregoing method of producing a single-walled carbon nanotube dispersion liquid that is characterized in further including a removal step of removing the single-walled carbon nanotube forming a bundle of which a length is 1.5 μm or less.

Further, the foregoing problems are solved by the foregoing method of producing a single-walled carbon nanotube dispersion liquid that is characterized in further including a supernatant collection process of centrifugating the dispersion liquid, and collecting a supernatant.

Further, the foregoing problems are solved by a method of producing a transparent conductive film that is characterized in coating a substrate member with the foregoing single-walled carbon nanotube dispersion liquid.

Further, the foregoing problems are solved by a transparent conductive film having the foregoing coated film of the single-walled carbon nanotube dispersion liquid formed upon the substrate member thereof.

An Advantageous Effect of the Invention

The single-walled carbon nanotube dispersion liquid containing the fullerene is very excellent in the dispersibility of the single-walled carbon nanotube. In particular, it is good in the dispersibility even though a concentration of the single-walled carbon nanotube is high. In addition, it is excellent in the dispersibility of the single-walled carbon nanotube even though water (or alcohol) is employed as a solvent. Further, it is very excellent in the dispersibility of the single-walled carbon nanotube notwithstanding a small quantity of the fullerene (dispersing agent).

And, the conductive film coated with this paint exhibits a special feature that is excellent in the transparency and the conductivity because the dispersibility is good.

BEST MODE FOR CARRYING OUT THE INVENTION

Figure 1:
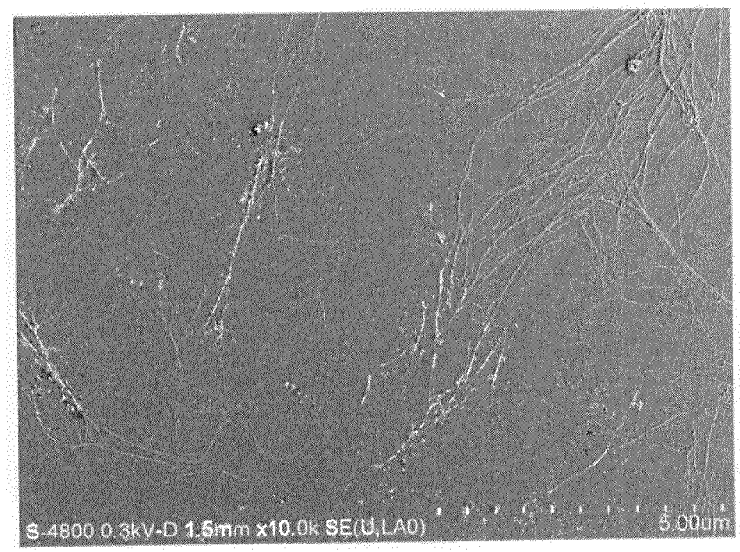
FIG. 1 is a scanning electron microscope picture of the single-walled carbon nanotube of an example 1.

The single-walled carbon nanotube dispersion liquid in accordance with the present invention contains the single-walled carbon nanotube, the fullerene, the solvent. A ratio of the single-walled carbon nanotube versus the fullerene is, particularly, 10 to 1000 mass parts of the fullerene per 100 mass parts of the single-walled carbon nanotube. And, a concentration of the fullerene is, particularly, 1 to 100000 ppm (Preferably, it is 10 ppm or more, and yet, 100 ppm or more. It is 10000 ppm or less, and yet, 5000 ppm or less). With the fullerene, the fullerene having a polar group is particularly preferable. Among others, the fullerene having an OH group is preferable. The single-walled carbon nanotube is, particularly, a single-walled carbon nanotube subjected to a wet oxidation process. Among others, the single-walled carbon nanotube is a single-walled carbon nanotube subjected to a wet oxidation process of performing a reflux operation for 24 hours or more with nitric acid having a concentration of 50% or more, or a mixed acid of nitric acid and sulfuric acid. And, the single-walled carbon nanotube obtained with the arc-discharge method is preferably employed. Further, the single-walled carbon nanotube, which has a first absorption in a Raman scattering intensity in a range of which a Raman shift is $1340 \pm 40$ cm$^{-1}$, and a second absorption in a Raman scattering intensity in a range of which a Raman shift is $1590 \pm 120$ cm$^{-1}$, and yet satisfies a condition of 0<(the foregoing intensity of the first absorption)/(the foregoing intensity of the second absorption)≤0.03) in terms of a Raman spectrum that is detected with the 532 nm laser excitation, is preferably employed. Further, the single-walled carbon nanotube existing within the liquid in a situation of being bundled, in which the number of the bundles of which a length exceeds 1.5 µm is more than that of the bundles of which a length is 1.5 µm or less, is preferable. Or, the single-walled carbon nanotube existing in a situation of being bundled, in which the length of the foregoing bundle is not single but has a predetermined distribution, and the foregoing predetermined distribution has a mode exceeding 1.5 µm in the frequency distribution of the bundle length for each 0.5 µm, is preferable. Among others, the single-walled carbon nanotube existing in a situation of being bundled, in which the length of the foregoing bundle is not single but has a predetermined distribution, the foregoing predetermined distribution has a mode exceeding 1.5 µm in the frequency distribution of the bundle length for each 0.5 µm, and yet the number of the bundles of which a length exceeds 1.5 µm is more than that of the bundles of which a length is 1.5 µm or less, is preferable. Various liquids are employed for the single-walled carbon nanotube dispersion liquid of the present invention as a solvent. However, water, alcohol (particularly, aliphatic alcohol of which a carbon number is 7 or less), or a mixed liquid thereof is preferable as a solvent being employed. Particularly, the solvent containing at least water is preferable. And, the solvent of which pH exceeds 7 is preferable (that is, the solvent indicating alkaline). Further, the single-walled carbon nanotube dispersion liquid has a maximal of the absorbance originating in the single-walled carbon nanotube in a range of 800 nm to 1200 nm in the case of measuring, particularly, the absorbance of the dispersion liquid diluted with the solvent employed for the dispersion liquid by a factor of 5, and the above maximal is 0.1 or more, and the single-walled carbon nanotube dispersion liquid has a maximal of the absorbance originating in the single-walled carbon nanotube in a range of 800 nm to 1200 nm in the case of measuring, particularly, the absorbance of the dispersion liquid diluted with the solvent employed for the dispersion liquid by a factor of 20, and the above maximal is 2.0 or less.

The present invention relates to a method of producing a single-walled carbon nanotube dispersion liquid. Particularly, it relates to a method of producing the foregoing single-walled carbon nanotube dispersion liquid. And, the method includes a mixture step of mixing a single-walled carbon nanotube, a fullerene, and a solvent. Yet, it includes a dispersion step of, after the foregoing mixture step, irradiating the obtained mixed liquid with ultrasonic waves, thereby to yield a dispersion liquid. Further, preferably, it further includes a removal step of removing the single-walled carbon nanotube forming the bundle of which a length is 1.5 µm or less from the dispersion liquid. Further, preferably, it further includes a supernatant collection process of centrifugating the dispersion liquid and collecting a supernatant.

The present invention relates to a method of producing a transparent conductive film. Particularly, it relates to a method of coating a substrate member, particularly, a transparent substrate member with the above-mentioned single-walled carbon nanotube dispersion liquid.

The present invention relates to a method of forming the above-mentioned coated film of the single-walled carbon nanotube dispersion liquid upon the substrate member (particularly, the transparent substrate member). In this coated film (conductive film) containing the single-walled carbon nanotube, the single-walled carbon nanotube exists, particularly, in a situation of being bundled. And, the number of the bundles of which a length exceeds 1.5 μm is more than that of the bundles of which a length is 1.5 μm or less. Or, the length of the foregoing bundle is not single but has a predetermined distribution, and the above predetermined distribution has a mode exceeding 1.5 μm in the frequency distribution of the bundle length for each 0.5 μm. The thickness of the conductive film having the single-walled carbon nanotube is, for example, 10 nm to 1000 nm. And, responding to a necessity, an agent as well for suppressing a decline in the conductivity due to a temperature of the single-walled carbon nanotube is contained in the conductive film. For example, polymer having a sulfonic acid group is contained. Or, the single-walled carbon nanotube is protected with the polymer having a sulfonic acid group. Or, the conductive layer is covered with the polymer having a sulfonic acid group. An total light transmittance of the transparent conductive film is 60% or more. Particularly, it is 80% or more. And, the surface resistivity is 1000Ω/□ or less. Particularly, it is 200Ω/□ or less.

Hereinafter, the present invention will be more detailedly explained.

With the fullerenes being employed in the present invention, any fullerene is acceptable. For example, C60, C70, C76, C78, C82, C84, C90, C96, etc. can be listed. Needless to say, a mixture of these plural kinds of the fullerenes may be also employed. Additionally, C60 is particularly preferable from a viewpoint of a dispersion performance. Yet, C60 is easy to obtain. Additionally, not only C60 but also a mixture of C60 and the other kinds of the fullerenes (for example, C70) may be employed.

The fullerene having a metal atom appropriately contained inside it is also acceptable.

The fullerene having well-known functional groups (polar groups) such as a hydroxyl group (OH group), a carboxyl group, an epoxy group, an ester group, an amide group, a sulfonyl group, and an ether group is preferable.

Further, the fullerene having phenyl-C61-propyl acid alkyl ester or phenyl-C61-butyric acid alkyl ester may be employed. A hydrogenated fullerene may be employed.

However, as mentioned above, the fullerene having an OH-group (hydroxyl group) is particularly preferable. The reason is that the dispersibility of the single-walled carbon nanotube is high. Additionally, a small quantity of the hydroxyl group does not lead to a large enhancement in the dispersibility of the single-walled carbon nanotube.

When the quantity of the hydroxyl group is much, the fullerene is hard to synthesize. Thus, it is preferable that the quantity of the hydroxyl groups is 5 to 30 pieces (per one molecule of the fullerene). Particularly, the quantity of 8 to 15 pieces is preferable.

Herein, it seems that the reason why the fullerene raises the dispersibility of the single-walled carbon nanotube is as follows. A benzene ring being contained in the fullerene and a graphene sheet constituting the side wall of the carbon nanotube physically adhere to each other due to a π-π interaction. And, outwardly, the fullerene acts as a functional group of the single-walled carbon nanotube. It is thinkable that this has raised the dispersibility of the single-walled carbon nanotube. Additionally, in the foregoing, the reason why the explanation was made, saying "outwardly", is that the fullerene and the single-walled carbon nanotube are not chemically coupled to each other, but are physically coupled (they adhere to each other). The foregoing π-π interaction is larger as compared with the action by the surfactant conventionally proposed. That is, the fullerene strongly adheres to the single-walled carbon nanotube, thereby raising the dispersibility of the single-walled carbon nanotube.

By the way, it is understandable that the fullerene having a polar group is preferably employed when the solvent is a solvent having a polar group. The reason is that the fullerene having a polar group is more easily soluble in a polar solvent (for example, water or alcohol) than in a non-polar solvent. Thus, the fullerene having the polar group as described above is preferably employed from a viewpoint of the dispersibility of the single-walled carbon nanotube.

By the way, when the single-walled carbon nanotube dispersion liquid is employed as a paint, water (or/and alcohol) is preferably employed as a solvent from a viewpoint of a reduction in the environmental burden and an improvement in the working environment. And, when such a solvent is employed, the fullerene having the functional groups (polar groups), for example, a hydroxyl group (OH-group), a carboxyl group, an epoxy group, an ester group, an amide group, a sulfonyl group, an ether group, or the like is preferably employed from a viewpoint of affinity between the solvent and the fullerene. Particularly, the fullerene having an OH-group (hydroxyl group) is preferable because water or alcohol has an OH-group.

It is preferable that a concentration of the fullerene is 1 ppm to 100000 ppm. Particularly, it is preferable that a concentration of the fullerene is 10 ppm to 10000 ppm. Among others, it is preferable that it is 100 ppm to 5000 ppm. The reason is that when the fullerene concentration is too high, a liquid viscosity become too high, which makes the coating difficult. To the contrary, when the fullerene concentration is too low, a large improvement in the dispersibility of the single-walled carbon nanotube is not yielded.

The carbon nanotube being employed in the present invention is the single-walled carbon nanotube. The reason is that the single-walled carbon nanotube is high in the conductivity as compared with a multi-walled carbon nanotube and the well-known carbon materials. The single-walled carbon nanotube subjected to the wet oxidation is preferable. The reason is that the dispersibility into the solvent is improved. No special limitation to the oxidation process is put so long as it is a wet oxidation process. However, inorganic acid (for example, hydrochloric acid, nitric acid, sulfuric acid, phosphoric acid, or a mixed acid thereof) is preferably employed for the wet oxidation. Particularly, nitric acid having a concentration of 50% or more, or a mixed acid of nitric acid and sulfuric acid is preferably employed. With the case of employing a mixed acid of nitric acid and sulfuric acid, when a volume ratio of water, nitric acid, and sulfuric acid over an entirety of a mixed acid solution is defined as a (volume %), b (volume %), and c (volume %), respectively, the mixed acid satisfying $0.20 \leq \{a/(a+b+c)\} \leq 0.40$ and $0.20 \leq \{b/(b+c)\} \leq 0.30$ is more preferable. With regard to the reaction condition of the wet oxidation as well, there is no special limitation hereto. However, so as to perform an effective acid process, it is preferable that the reaction temperature is 85° C. or more. It is preferable that the reaction time is 24 hours or more and yet, it is 48 hours or more.

The single-walled carbon nanotube produced with any technique is employed in the present invention. The single-walled carbon nanotube is obtained, for example, with an arc discharge method, a laser ablation method, and a chemical vapor deposition method. However, the single-walled carbon nanotube obtained with the arc discharge method is preferably employed from a viewpoint of crystallization and a yield.

The single-walled carbon nanotube of which a purity is high is preferably employed in the present invention. The reason is that a low purity leads to a decline in a transparency. The purity of the single-walled carbon nanotube can be confirmed with a Raman spectrum measurement. Specifically, with a ratio of an absorption intensity originating in the graphene sheet, being a main component constituting the carbon nanotube, and an absorption intensity originating in a component indicative of a carbon material other than it, the purity of the carbon nanotube can be confirmed. For example, with the case of the single-walled carbon nanotube produced by the arc-discharge with the 532 nm laser excitation, it has a first absorption in a Raman scattering intensity in a range of which a Raman shift is 1340+40 cm$^{-1}$, and has a second absorption a Raman scattering intensity in a range of which a Raman shift is 1590+20 cm$^{-1}$. Herein, it is said that the first absorption is an absorption originating in an sp$^3$ orbital of the carbon atom, and the second absorption is an absorption originating in the graphene sheet. And, the carbon nanotube of which the second absorption intensity is larger as compared with its first absorption intensity is higher in the purity. And, the single-walled carbon nanotube in accordance with the present invention satisfying the following condition is preferable. That is, the single-walled carbon nanotube, which has a first absorption in a Raman scattering intensity in a range of which a Raman shift is 1340+40 cm$^{-1}$, and a second absorption in a Raman scattering intensity in a range of which a Raman shift is 1590+20 cm$^{-1}$ in terms of a Raman spectrum characteristic that is detected with the 532 nm laser excitation, and satisfies Equation (1) when the foregoing first absorption intensity and the foregoing second absorption intensity are defined as ID and IG, respectively, is preferable. The single-walled carbon nanotube satisfying Equation (2) is particularly preferable. That is, when a value of ID/IG was 0.03 or less, the single-walled carbon nanotube was high in the purity, and was excellent in both of the transparency/conductivity.

$$0<ID/IG=\leq 0.03 \quad \text{Equation (1)}$$

$$0<ID/IG\leq 0.02 \quad \text{Equation (2)}$$

The single-walled carbon nanotube preferably forms a bundle in the dispersion liquid (in addition, in the conductive film). In the present invention, the so-called bundle signifies a situation (shape) in which plural pieces of the single-walled carbon nanotubes are overlapped upon each other due to van der Waals force of side wall. Additionally, the single-walled carbon nanotube prepared with the conventionally known method is obtained in a situation of being bundled. The lengths of this bundle have a certain distribution. However, the single-walled carbon nanotube having the following characteristics is particularly preferable. That is, with the single-walled carbon nanotube, the lengths of the bundle thereof have a certain distribution. This distribution is characteristic. For example, the number of the bundles of which the length exceeds 1.5 μm is more than that of the bundles of which the length is 1.5 μm or less. Preferably, the number of the bundles of which the length is 2.0 μm or more is more than that of the bundles of which the length is 1.5 μm or less. Yet preferably, the number of the bundles of which the length is 2.5 μm or more is more than that of the bundles of which the length is 1.5 μm or less. Or, a mode in a frequency distribution (a frequency distribution table or a frequency distribution diagram) of the bundle length for each 0.5 μm exceeds 1.5 μm. Preferably, a mode in a frequency distribution of the length of the bundle exceeds 2.0 μm. Yet preferably, a mode in a frequency distribution of the length of the bundle exceeds 2.5 μm. And, when the bundle had a distribution having the above-mentioned characteristic, the single-walled carbon nanotube was excellent in both of the transparency/conductivity.

The method of observing the single-walled carbon nanotube with a scanning electron microscope, and measuring its length is employed for measuring the length of the bundle. Additionally, the method is not limited hereto. No special limitation to the number of the bundles being measured is put. However, so as to obtain accurate statistics, it is preferable to measure 50 bundles or more. Yet, it is more preferable to measure 100 bundles or more. At the moment of measuring the length of the bundle, existence of a lot of impurities makes the measurement difficult. Thus, it is preferable to firstly remove the impurities to an extent in which the length is measurable, and then to measure the length. Further, the length is difficult to measure in a situation in which the bundles are massed. Thus, it is preferable that the bundles are dispersed to an extent in which the bundles can be measured one by one.

No special limitation to an aspect of the frequency distribution diagram (table) associated with the length of the bundle is put. For example, any of a symmetrical distribution, an asymmetrical distribution, a J letter-type distribution, a U letter-type distribution, and a bimodal distribution is acceptable. However, the symmetrical distribution is preferable. In the present invention, the so-called mode signifies a value of a rank having the highest frequency, out of all ranks. When the rank number is classified, the range is divided for each 0.5 μm, and the number of each division is collected.

With the solvent being employed in the present invention, a solvent being employed for the general-use paint is acceptable. No special limit hereto is put. However, the solvent of which a boiling point is 200° C. or less is preferable (the preferable lower limit value is 25° C., and yet, it is 30° C.). The reason why the solvent having a low boiling point is preferable is that drying after coating is made easy. Specifically, alcohol compounds (particularly, alcohol of which a carbon number is 7 or less, and particularly, aliphatic alcohol) such as water, methanol, ethanol, normal-propanol, and isopropanol, or a mixture thereof are preferable. The solvent indicative of alkaline in which pH exceeds 7 is preferable when water is employed. The reason is that the fullerene containing a hydroxyl group is highly soluble. That is, the single-walled carbon nanotube dispersion liquid having a higher concentration can be obtained. Besides, for example, ketone compounds such as acetone, methyl ethyl ketone, methyl isobutyl ketone, and cyclohexanone can be employed. Further, ester compounds such as methyl acetate, ethyl acetate, butyl acetate, ethyl lactate, and methoxyethyl acetate can be employed. Further, ether compounds such as diethyl ether, ethylene glycol dimethyl ether, ethyl cellosolve, butyl cellosolve, phenyl cellosolve, and dioxane can be employed. Further, aromatic compounds such as toluene and xylene can be employed. Further, aliphatic compounds such as pentane and hexane can be employed. Further, halogenic hydrocarbons such as dichloromethane, chlorobenzene, and chloroform can be employed. A mixture of the foregoing compounds can be employed.

A concentration of the single-walled carbon nanotube in the single-walled carbon nanotube dispersion liquid can be measured quantitatively with a spectrometer. That is, measuring an absorbance by employing the spectrometer makes it possible to quantitatively measure a concentration of the single-walled carbon nanotube. In addition, preparing a standard curve to obtain a proportionality constant indicative of an absorbance and a mass ratio makes it possible to indicate the concentration with the mass ratio.

Additionally, the above-mentioned proportionality constant differs depending upon the employed single-walled carbon nanotube. Hereinafter, the explanation will be made with the absorbance, which can be easily measured, as an index.

In the case of employing the single-walled carbon nanotube dispersion liquid in accordance with the present invention, the dispersion liquid becomes pasty when a concentration of the single-walled carbon nanotube is too high. Thus, the coating becomes difficult. When a concentration of the single-walled carbon nanotube is too low, the coating has to be repeatedly carried out many times. As a result of having pushed an investigation for solving the foregoing problem from such a viewpoint, a conclusion that the following single-walled carbon nanotube dispersion liquid is preferable has been reached. That is, with the case of measuring the absorbance of the above single-walled carbon nanotube dispersion liquid diluted with the solvent employed for the above dispersion liquid by a factor of 5, it has a maximal of the absorbance originating in the single-walled carbon nanotube in a range of 800 nm to 1200 nm. This maximal is 0.1 or more. Further, with the case of measuring the absorbance of the dispersion liquid diluted with the solvent employed for the above dispersion liquid by a factor of 20, it has a maximal of the absorbance originating in the single-walled carbon nanotube in a range of 800 nm to 1200 nm. This maximal is 2.0 or less. The dispersion liquid of which the maximal obtained by diluting the dispersion liquid by a factor of 5 is 0.2 or more, and of which the maximal obtained by diluting the dispersion liquid by a factor of 20 is 1.5 or less is more preferable. The dispersion liquid of which the maximal obtained by diluting the dispersion liquid by a factor of 5 is 0.3 or more, and of which the maximal obtained by diluting the dispersion liquid by a factor of 20 is 1.2 or less is yet more preferable.

The above-mentioned single-walled carbon nanotube and fullerene, and solvent are employed by a predetermined quantity, respectively, and the single-walled carbon nanotube dispersion liquid is produced.

That is, the single-walled carbon nanotube dispersion liquid is produced through the following steps.

Step 1: a step of mixing the single-walled carbon nanotube and the fullerene, and the solvent.

Step 2: a step of irradiating the mixed liquid obtained in the step 1 with ultrasonic waves, thereby to yield the dispersion liquid.

The step 1 is a step for mixing the single-walled carbon nanotube and the fullerene, and the solvent. In this step 1, the single-walled carbon nanotube, the fullerene, and the solvent may be mixed simultaneously. Or, after dissolving the fullerene in the solvent, thereby to yield a fullerene solution, the single-walled carbon nanotube may be mixed. Or, after mixing the single-walled carbon nanotube and the solvent, the fullerene may be added hereto. Additionally, the dispersing agent such as the surfactant may be added.

The step 2 is a step of irradiating the mixed liquid obtained in the step 1 with ultrasonic waves, thereby to yield the dispersion liquid. A bath-type sonicator can be employed for ultrasonic irradiation (sonication). Further, a cone-type sonicator can be employed therefor. Needless to say, other sonicators may be employed. Additionally, the cone-type sonicator, which yields a high power, is preferably employed. The time of the sonication cannot be fixed sweepingly because it is also governed by the power of the sonicator. However, for example, with case of employing the cone-type sonicator, the irradiation time of 30 seconds to 10 minutes is preferable. That is, too short irradiation time causes insufficient dispersion. To the contrary, too long irradiation time causes the single-walled carbon nanotube to be damaged. Particularly, the bundle results in being destroyed.

After the above-mentioned step 2, it is preferable to go through a next step 3 (a step of centrifugating the dispersion liquid obtained in the step 2, and collecting a supernatant). This step is performed for a purpose of removing the single-walled carbon nanotube that has not been dispersed in the step 2, and obtaining the conductive film that is higher in the transparency. Additionally, too strong centrifugation causes the dispersed single-walled carbon nanotube to be removed. To the contrary, when the centrifugation is too weak, the single-walled carbon nanotube that has not been dispersed cannot be removed. Thus, the dispersion liquid is preferably centrifugated in a condition of 1000 G to 10000 G (yet, 3000 G or more. 5000 G or less). The single-walled carbon nanotube dispersion liquid that has been more uniformly dispersed can be obtained as a result of passing through this step 3.

Further, it is preferable to pass through a next step X (a step of removing the single-walled carbon nanotube forming a bundle of 1.5 μm or less from among the single-walled carbon nanotubes) before the above-mentioned steps 1 and 2 (and/or after). Specifically, the separation (removal) step using a filtering method can be listed. Various filtering methods are employed for the filtering. For example, a suction filtration can be employed. Further, a pressure filtration can be employed. Further, a cross-flow filtration can be employed. Additionally, which step, out of the step X and the step 3, is performed firstly is arbitrary.

The substrate member is coated with the single-walled carbon nanotube dispersion liquid obtained as mentioned above, and the transparent conductive film is obtained. And, as described above, the single-walled carbon nanotube dispersion liquid in accordance with the present invention is high in the dispersibility of the single-walled carbon nanotube. For example, it is dispersed in the solvents such as water and alcohol at a high dispersibility. Thus, various coating methods such as a spray coating method, a bar coating method, a roll coating method, an inkjet method, a screen coating method can be employed.

No special limit to the substrate member being coated with the single-walled carbon nanotube dispersion liquid is put. The transparent substrate member (film, sheet, plate of which a thickness is higher than the foregoing film (sheet)) is preferable in a field in which the transparency is required, for example, a transparent electrode being employed for a display etc. For example, acrylic resin, polyester resin, polycarbonate resin, polystyrene resin, styrene-acrylic acid copolymer, vinyl chloride resin, polyolefin, ABS (acrylonitrile-butadiene-styrene copolymer), vinyl alcohol resin, cycloolefin resin, cellulose resin, etc. can be employed. Besides, inorganic glass etc. can be employed. However, the substrate member made of organic resin that is excellent in flexibility is preferable. A hard coat layer, an anti-contamination layer, an anti-glare layer, an anti-reflection layer, an adhesive layer, a colored layer etc. are formed (laminated) on the surface of the foregoing substrate member (the surface of the side in which the conductive layer is formed, and/or on the backside opposite to the side in which the conductive layer is formed) responding to a necessity. The thickness of the substrate member is governed by the purpose thereof. However, as a rule, it is 10 μm to 10 mm or so.

After the above-mentioned coating step, so as to remove the solvent being contained in the coated film, a drying operation is performed. A heating oven is employed for the drying operation. Further, a far infrared oven may be employed. Further, an ultra-far infrared oven may be employed. Besides these ovens, the apparatuses, which can be usually used for drying, can be employed.

In the above-mentioned manner, the transparent conductive film, which is characteristic of the foregoing, can be obtained. Specifically, the transparent conductive film, of which the total light transmission is 60% or more and yet of which the surface resistivity is 1000Ω/□ or less, can be obtained. Particularly, the transparent conductive film, of which the total light transmittance is 70% or more, and yet of which the surface resistivity is 500Ω/□ or less, can be obtained. Yet, the transparent conductive film, of which the total light transmittance is 80% or more and yet of which the surface resistivity is 200Ω/□ or less, can be obtained. Moreover, it can be obtained at a simple way/low cost. Additionally, herein, the total light transmittance is an total light transmittance relating to not only the conductive film containing the single-walled carbon nanotube but also the substrate member. And, the transparent conductive film, which is characteristic of the foregoing, can be utilized for an electrode substrate for a touch panel. Further, it can be utilized for an electrode substrate for electronic paper. Further, it can be utilized for an electrode substrate for a liquid crystal display. Further, it can be utilized for an electrode substrate for plasma display. Besides, it can be utilized for various applications.

Hereinafter, the present invention will be explained by listing specific examples. Additionally, needless to say, the present invention is not limited to the following examples.

EXAMPLE 1

Step X, 1

The single-walled carbon nanotube was prepared with the arc-discharge method. This prepared single-walled carbon nanotube was subjected to the reaction (wet oxidation) with nitric acid having a concentration of 63% at 85° C. for 2 days. Thereafter, the single-walled carbon nanotube was purified/collected with the filtering.

Figure 2:
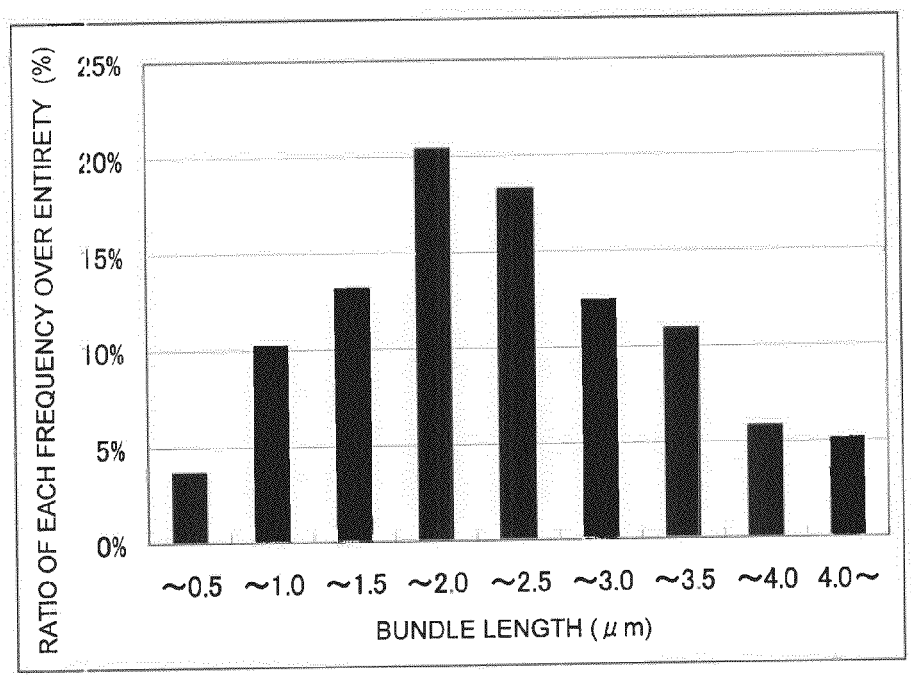
FIG. 2 is a frequency distribution diagram for the length of the single-walled carbon nanotube of the example 1.

Additionally, the scanning electron microscope picture of this purified single-walled carbon nanotube is shown in FIG. 1. Further, a measurement result of the length of the bundles of the single-walled carbon nanotube is shown in FIG. 2. It can be seen from the frequency distribution for each 0.5 μm (FIG. 2) that a mode exists in the range of 1.5 μm to 2.0 μm. And, a ratio of the number of the bundles of the single-walled carbon nanotube of which the length of the bundle exceeds 1.5 μm over an entirety is 73%. A ratio of the number of the bundles of the single-walled carbon nanotube of which the length of the bundle is 1.5 μm or less over an entirety is 27%. That is, it can be seen that the number of the bundles of the single-walled carbon nanotube of which the length of the bundle is 1.5 μm or less is smaller than that of the bundles of the single-walled carbon nanotube of which the length of the bundle exceeds 1.5 μm.

Figure 3:
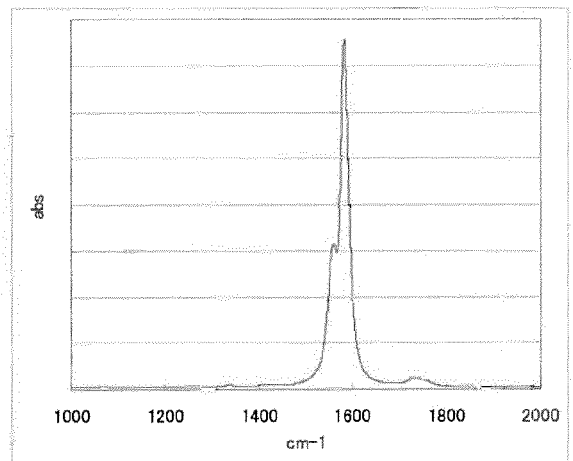
FIG. 3 is a Raman measurement diagram of the single-walled carbon nanotube of the example 1.

Further, a result of having made a Raman measurement of the obtained single-walled carbon nanotube demonstrated that ID/IG was 0.013 (see FIG. 3) (532 nm wavelength and a name of the apparatus: HoloLab 5000 manufactured by Shimadzu Corporation).

And, 20 mg of the single-walled carbon nanotube obtained in the above-mentioned manner, 3 mg of the fullerene containing a hydroxyl group (a product name: Nanom Spectra D-100 produced by Frontier Carbon Corporation; the fullerene is consisted of only C60), 0.3 mg of sodium hydroxide (produced by Wako Pure Chemical Industries, Ltd.), 5 ml of water, and 5 ml of methanol were mixed.

Step 2

The mixed liquid obtained in the above-mentioned step 1 was irradiated with the ultrasonic waves. That is, the mixed liquid was irradiated with the ultrasonic waves by employing an sonicator (ULTRASONIC HOMOGENIZER MODEL UH-600SR manufactured by SMT Co., Ltd.) and was subjected to an ultrasonic dispersion. And, the single-walled carbon nanotube dispersion liquid was obtained.

Step 3

Figure 4:
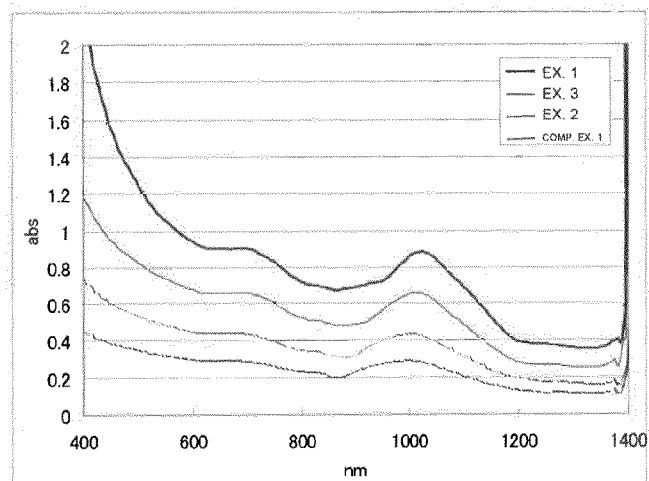
FIG. 4 is a spectrum measurement diagram of the single-walled carbon nanotube dispersion liquid of examples 1 to 3 and a comparative example 1 (any dispersion liquid was by a factor of 5 diluted with the solvent employed for the single-walled carbon nanotube dispersion liquid, and measured.)

The single-walled carbon nanotube dispersion liquid obtained in the above-mentioned step 2 was subjected to a centrifugation operation by employing a centrifuge (a product name: CR26H manufactured by Hitachi Koki Co., Ltd.) The condition of the centrifugation is 6000 rpm (4400 G) for 30 minutes. And, the centrifugated supernatant was collected. And, the concentration of this supernatant was measured with the spectrometer. A result thereof is shown in FIG. 4. As a result, it became clear that a concentration of the single-walled carbon nanotube was 580 ppm (see Table 1).

TABLE 1

|  | Example 1 | Example 2 | Example 3 | Example 4 | Example 5 | Example 6 | Example 7 | Comparative Example 1 |
|---|---|---|---|---|---|---|---|---|
| Fullerene concentration (ppm) | 300 | 30 | 100 | 900 | 1500 | 3000 | 10000 | 0 |
| Single-walled carbon nanotube concentration (ppm) | 580 | 281 | 422 | 1459 | 1423 | 1390 | 2628 | 185 |

Step 4

The bar coating was carried out for polycarbonate substrate having the hard coat with the single-walled carbon nanotube dispersion liquid centrifugated in the above-mentioned step 3. A coating thickness (wet thickness) is 50 μm. And, after the coating, it was dried at 80° C. for 3 minutes. With this, the polycarbonate substrate with the transparent conductive film was obtained.

EXAMPLE 2

The operation was performed similarly to the case of the example 1 except that the quantity of the fullerene containing the hydroxyl group and sodium hydroxide employed in the example 1 was 0.3 mg and 0.03 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 4 and Table 1.

EXAMPLE 3

The operation was performed similarly to the case of the example 1 except that the quantity of the fullerene containing the hydroxyl group and sodium hydroxide employed in the example 1 was 1 mg, and 0.1 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 4 and Table 1.

COMPARATIVE EXAMPLE 1

The operation was performed similarly to the case of the example 1 except that the fullerene containing the hydroxyl group employed in the example 1 was not employed, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 4 and Table 1.

EXAMPLE 4

The operation was performed similarly to the case of the example 1 except that the quantity of the fullerene containing the hydroxyl group and sodium hydroxide employed in the example 1 was 9 mg, and 0.9 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Figure 5:
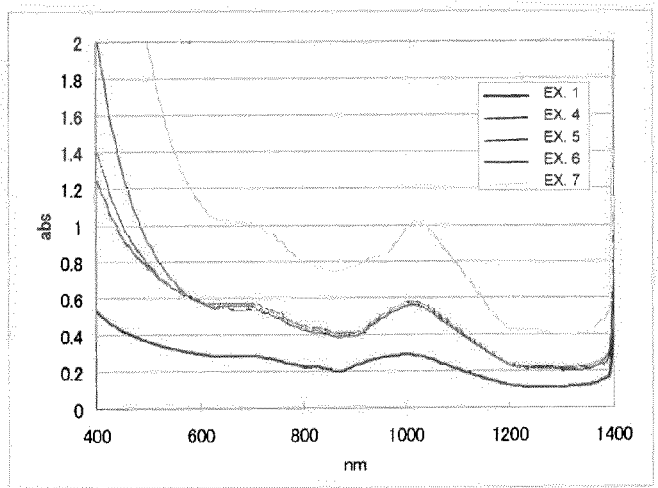
FIG. 5 is a spectrum measurement diagram of the single-walled carbon nanotube dispersion liquid of examples 1, and 4 to 7 (any dispersion liquid was by a factor of 20 diluted with the solvent employed for the single-walled carbon nanotube dispersion liquid, and measured.)

Additionally, a measurement result of the concentration of the single-walled carbon nanotube etc. in the single-walled carbon nanotube dispersion liquid is shown in FIG. 5 and Table 1.

EXAMPLE 5

The operation was performed similarly to the case of the example 1 except that the quantity of the fullerene containing the hydroxyl group and sodium hydroxide employed in the example 1 was 15 mg, and 0.15 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 5 and Table 1.

EXAMPLE 6

The operation was performed similarly to the case of the example 1 except that the quantity of the fullerene containing the hydroxyl group and sodium hydroxide employed in the example 1 was 30 mg, and 3 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 5 and Table 1.

EXAMPLE 7

The operation was performed similarly to the case of the example 1 except that the quantity of the single-walled carbon nanotube, the fullerene containing the hydroxyl group, and sodium hydroxide employed in the example 1 was 40 mg, 100 mg, and 10 mg, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 5 and Table 1.

EXAMPLE 8

The operation was performed similarly to the case of the example 1 except that the quantity of water and methanol employed in the example 1 was 1 ml and 9 ml, respectively, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Figure 6:
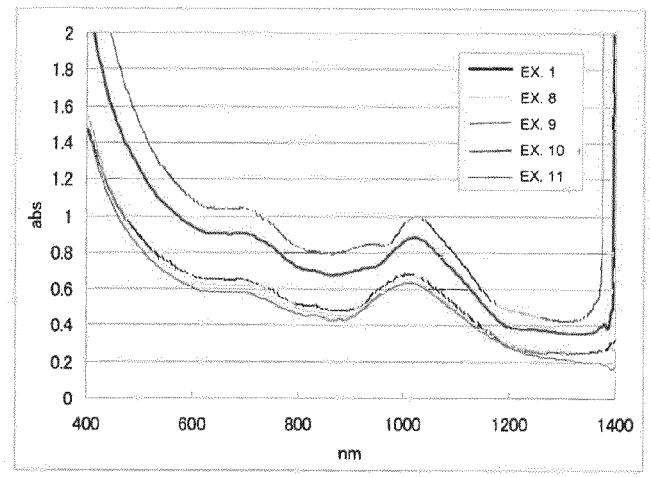
FIG. 6 is a spectrum measurement diagram of the single-walled carbon nanotube dispersion liquid of examples 1, and 8 to 11 (any dispersion liquid was diluted by a factor of 5, and measured.)

Additionally, a measurement result of the concentration of the single-walled carbon nanotube etc. in the single-walled carbon nanotube dispersion liquid is shown in FIG. 6 and Table 2.

TABLE 2

|  | Example 1 | Example 8 | Example 9 | Example 10 | Example 11 |
|---|---|---|---|---|---|
| Water | 50 vol % | 10 vol % | 100 vol % | 10 vol % | 10 vol % |
| Methanol | 50 vol % | 90 vol % |  |  |  |
| 2-propanol |  |  |  | 90 vol % |  |
| Acetone |  |  |  |  | 90 vol % |
| Toluene |  |  |  |  |  |
| Single-walled carbon nanotube concentration (ppm) | 580 | 399 | 666 | 417 | 373 |

EXAMPLE 9

The operation was performed similarly to the case of the example 1 except that the quantity of water and methanol employed in the example 1 was 10 ml and 0 ml, respectively, and the single-walled carbon nanotube dispersion liquid was obtained.

Additionally, a measurement result of the concentration of the single-walled carbon nanotube etc. in the single-walled carbon nanotube dispersion liquid is shown in FIG. 6 and Table 2.

EXAMPLE 10

The operation was performed similarly to the case of the example 1 except that the quantity of water was 1 ml and 9 ml of 2-propanol was employed instead of methanol employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 6 and Table 2.

EXAMPLE 11

The operation was performed similarly to the case of the example 1 except that the quantity of water was 1 ml and 9 ml of acetone was employed instead of methanol employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 6 and Table 2.

EXAMPLE 12

The operation was performed similarly to the case of the example 1 except that 3 mg of the fullerene produced by Frontier Carbon Corporation (a product name: Nanom Purple) was employed as a fullerene and 10 ml of toluene was employed instead of 5 ml of water and 5 ml of methanol employed in the example 1, and the single-walled carbon nanotube dispersion liquid was obtained.

Figure 7:
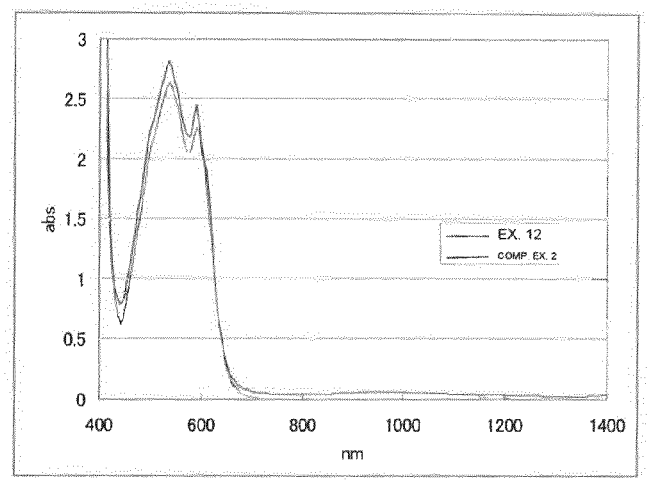
FIG. 7 is a spectrum measurement diagram of the single-walled carbon nanotube dispersion liquid of an example 12 and a comparative example 2.

Additionally, a measurement result of the concentration of the single-walled carbon nanotube etc. in the single-walled carbon nanotube dispersion liquid is shown in FIG. 7 and Table 3.

TABLE 3

|  | Example 12 | Comparative Example 2 |
|---|---|---|
| Toluene | 100 vol % | 100 vol % |
| Fullerene | 1000 ppm | Nothing |
| Single-walled carbon nanotube concentration (ppm) | 10 | 0 |

COMPARATIVE EXAMPLE 2

The operation was performed similarly to the case of the example 12 except that the fullerene employed in the example 12 was not employed, and the single-walled carbon nanotube dispersion liquid was obtained.

Figure 8:
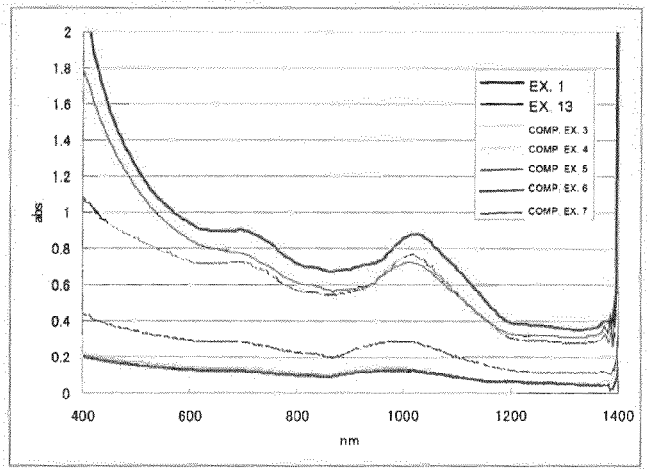
FIG. 8 is a spectrum measurement diagram of the single-walled carbon nanotube dispersion liquid of the example 1, and comparative examples 3 to 7 (any dispersion liquid was diluted by a factor of 5, and measured.)

Additionally, a measurement result of the concentration of the single-walled carbon nanotube etc. in the single-walled carbon nanotube dispersion liquid is shown in FIG. 8 and Table 3.

EXAMPLE 13

The operation was performed similarly to the case of the example 1 except that 3 mg of the fullerene containing a hydroxyl group (a product name: Nanom Spectra D-200 produced by Frontier Carbon Corporation: the fullerene is a mixture of C60 and C70) was employed instead of 3 mg of the fullerene containing a hydroxyl group (a product name: Nanom Spectra D-100 produced by Frontier Carbon Corporation) employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

TABLE 4

|  | Example 1 | Example 13 | Comp. example 3 | Comp. example 4 | Comp. example 5 | Comp. example 6 | Comp. example 7 |
|---|---|---|---|---|---|---|---|
| Dispersing agent | Fullerene containing a hydroxyl group (only C60) | Fullerene containing a hydroxyl group (a mixture of C60 and C70) | Sodium dodecyl sulfate | Sodium dodecyl benzene sulfonate | Octylphenol Polyethylene glycol ether | Sodium cholate | Polyvinyl pyrrolidone |
| Single-walled carbon nanotube concentration (ppm) | 580 | 511 | 81 | 91 | 182 | 78 | 462 |

COMPARATIVE EXAMPLE 3

The operation was performed similarly to the case of the example 1 except that sodium dodecyl sulfate (produced by Wako Pure Chemical Industries, Ltd.) was employed instead of the fullerene containing a hydroxyl group employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

COMPARATIVE EXAMPLE 4

The operation was performed similarly to the case of the example 1 except that sodium dodecyl benzene sulfonate (produced by Wako Pure Chemical Industries, Ltd.) was employed instead of the fullerene containing a hydroxyl group employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

COMPARATIVE EXAMPLE 5

The operation was performed similarly to the case of the example 1 except that octylphenol polyethylene glycol ether (produced by TOKYO CHEMICAL INDUSTRY CO., LTD.) was employed instead of the fullerene containing a hydroxyl group employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

COMPARATIVE EXAMPLE 6

The operation was performed similarly to the case of the example 1 except that Sodium cholate (produced by Wako Pure Chemical Industries, Ltd.) was employed instead of the fullerene containing a hydroxyl group employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

COMPARATIVE EXAMPLE 7

The operation was performed similarly to the case of the example 1 except that polyvinylpyrrolidone (produced by Sigma-Aldrich Co.: a molecular weight is 55,000) was employed instead of the fullerene containing a hydroxyl group employed in the example 1, and the single-walled carbon nanotube dispersion liquid was obtained.

And, the operation was performed similarly to the case of the example 1 by employing this single-walled carbon nanotube dispersion liquid, and the polycarbonate substrate with the transparent conductive film was obtained.

Additionally, a measurement result of the concentration of the single-walled carbon nanotube etc. in the single-walled carbon nanotube dispersion liquid is shown in FIG. 8 and Table 4.

Special Features

It can be seen from the result (Table 1) of the above-mentioned example 1 to example 8 and the comparative example 1 that employing the fullerene facilitates the dispersion of the single-walled carbon nanotube.

Further, it can be seen from the result (Table 2 and Table 3) of the example 8 to example 12 and the comparative example 2 that even though the alcohol solvent and the non-water solvent are employed, the single-walled carbon nanotube can be dispersed therein.

Further, it can be seen from the result (Table 4) of the examples 1 and 13, and the comparative examples 3 to 7 that the present invention enables the single-walled carbon nanotube dispersion liquid of which the concentration is higher as compared with the case of the prior art to be obtained.

That is, it can be seen that the single-walled carbon nanotube dispersion liquid in accordance with the present invention is excellent in the dispersibility of the single-walled carbon nanotube even though the concentration thereof is high.

Next, the total light transmittance (an apparatus name: Direct-Reading Haze Computer manufactured by Suga Test Instruments Co., Ltd.) and the surface resistivity (an apparatus name: Loresta-EP manufactured by Dias Instruments Co., Ltd.) of the polycarbonate substrate with the transparent conductive film obtained as mentioned above were measured, so its result is shown in Table 5.

It can be seen from this Table 5 that employment of the single-walled carbon nanotube dispersion liquid in accordance with the present invention enables the transparent conductive film of which both of the transparent and the conductivity are excellent to be obtained.

TABLE 5

| | Total light transmittance (%) | Surface resistance value $\Omega/\square$ | Remarks |
|---|---|---|---|
| Example 1 | 89.8 | 2220 | |
| Example 2 | 90.3 | 4800 | |
| Example 3 | 90.0 | 3200 | |
| Example 4 | 86.4 | 610 | |
| Example 5 | 83.9 | 470 | |
| Example 6 | 82.3 | 870 | |
| Example 7 | 73.2 | 1350 | |
| Example 8 | 90.0 | 3300 | |
| Example 10 | 90.3 | 2800 | |
| Example 11 | 89.8 | 4200 | |
| Example 13 | 90.2 | 2400 | |
| Comparative example 1 | 90.3 | 32000 | |

TABLE 5-continued

| | Total light transmittance (%) | Surface resistance value Ω/□ | Remarks |
|---|---|---|---|
| Comparative example 3 | — | — | Not less than a measurement limit value |
| Comparative example 4 | — | — | Not less than a measurement limit value |
| Comparative example 5 | 90.2 | 23000 | |
| Comparative example 6 | — | — | Not less than a measurement limit value |
| Comparative example 7 | — | — | Not less than a measurement limit value |

HOW THE INVENTION IS CAPABLE OF INDUSTRIAL EXPLOITATION

The present invention can be advantageously utilized, for example, for a transparent electrode, a touch panel member, and an electromagnetic wave shield material.

The invention claimed is:

1. A single-walled carbon nanotube liquid dispersion, comprising:
    single-walled carbon nanotubes;
    a fullerene having at least one OH group; and
    a solvent,
    wherein
        the solvent is at least one member selected from the group consisting of water and alcohol, and
        the fullerene having at least one OH group physically adheres to a single-walled carbon nanotube and raises the dispersibility of the single-walled carbon nanotube in the solvent wherein the fullerene is physically adhering to the single-walled carbon nanotubes due to a π-π interaction between a benzene ring being contained in the fullerene and a graphene sheet constituting the side wall of the single-walled carbon nanotube.

2. The single-walled carbon nanotube liquid dispersion as claimed in claim 1, having a content of 10 to 1000 mass parts of the fullerene having at least one OH group per 100 mass parts of the at least one single-walled carbon nanotube.

3. The single-walled carbon nanotube liquid dispersion as claimed in claim 1, wherein a concentration of the fullerene having at least one OH group is 1 to 100000 ppm.

4. The single-walled carbon nanotube liquid dispersion as claimed in claim 1, wherein the at least one single-walled carbon nanotube is an oxidized single-walled carbon nanotube.

5. The single-walled carbon nanotube liquid dispersion as claimed in claim 4, wherein the oxidized single-walled carbon nanotube is obtained by a method comprising wet oxidation by refluxing the single-walled carbon nanotube dispersion liquid for 24 hours or more with nitric acid having a concentration of 50% or more, or a mixed acid of nitric acid and sulfuric acid.

6. The single-walled carbon nanotube liquid dispersion as claimed in claim 1, wherein the at least one single-walled carbon nanotube is obtained with an arc-discharge method.

7. The single-walled carbon nanotube liquid dispersion as claimed in claim 1, wherein the at least one single-walled carbon nanotube has a first absorption in a Raman scattering intensity in a range of which a Raman shift is 1340±40 $cm^{-1}$, and a second absorption in a Raman scattering intensity in a range of which a Raman shift is 1590±20 $cm^{-1}$, and yet satisfies a condition of 0<(said intensity of the first absorption)/(said intensity of the second absorption)≤0.03 in terms of a Raman spectrum characteristic being detected with a 532 nm laser excitation.

8. The single-walled carbon nanotube liquid dispersion as claimed in claim 1, wherein the at least one single-walled carbon nanotube is in the form of bundles wherein a number of bundles having a length exceeding 1.5 μm is more than a number of bundles having a length of 1.5 μm or less.

9. The single-walled carbon nanotube liquid dispersion as claimed in claim 8, wherein the length of the bundles has a predetermined distribution wherein a median value exceeds 1.5 μm.

10. The single-walled carbon nanotube liquid dispersion as claimed in claim 1, wherein the fullerene having at least one OH group, comprises from 5 to 30 OH groups.

11. The single-walled carbon nanotube liquid dispersion as claimed in claim 10, wherein the fullerene comprises from 8 to 15 OH groups.

12. The single-walled carbon nanotube liquid dispersion as claimed in claim 1, wherein a pH of the solvent exceeds 7.

13. The single-walled carbon nanotube liquid dispersion as claimed in claim 1 which provides a transparent conductive film when applied to a substrate.

14. The single-walled carbon nanotube liquid dispersion as claimed in claim 1:
    wherein when the single-walled carbon nanotube dispersion liquid is diluted with the solvent employed for the dispersion liquid by a factor of 5 an absorbance maximum in a range of 800 nm to 1200 nm is 0.1 or more; and
    when the single-walled carbon nanotube dispersion liquid is diluted by a factor of 20 the maximum absorbance in the range of 800 nm to 1200 nm is 2.0 or less.

15. The single-walled carbon nanotube liquid dispersion as claimed in claim 1, wherein the fullerene comprises from 8 to 15 OH groups and a concentration of the fullerene comprising from 8 to 15 OH groups is from 100 ppm to 5,000 ppm.

16. A single-walled carbon nanotube liquid dispersion comprising at least one single-walled carbon nanotube, a fullerene having at least one OH group, and a solvent:
    wherein when the single-walled carbon nanotube dispersion liquid is diluted with the solvent employed for the dispersion liquid by a factor of 5 an absorbance maximum in a range of 800 nm to 1200 nm is 0.1 or more;
    when the single-walled carbon nanotube dispersion liquid is diluted by a factor of 20 the maximum absorbance in the range of 800 nm to 1200 nm is 2.0 or less and wherein the fullerene is physically adhering to the single-walled carbon nanotubes due to a π-π interaction between a benzene ring being contained in the fullerene and a graphene sheet constituting the side wall of the single-walled carbon nanotube.

* * * * *